United States Patent
Naruse et al.

(10) Patent No.: US 6,922,990 B2
(45) Date of Patent: Aug. 2, 2005

(54) DEVICE ARRANGEMENT STRUCTURE FOR HYBRID CONSTRUCTION EQUIPMENT

(75) Inventors: Masami Naruse, Hirakata (JP); Naritoshi Ohtsukasa, Isehara (JP); Hiroyuki Inoue, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/702,207

(22) Filed: Nov. 4, 2003

(65) Prior Publication Data

US 2004/0098983 A1 May 27, 2004

(30) Foreign Application Priority Data

Nov. 21, 2002 (JP) ........................................ 2002-338132

(51) Int. Cl.[7] .............................................. E02F 9/00
(52) U.S. Cl. ................................................... 60/414
(58) Field of Search .......................... 60/413, 414, 428

(56) References Cited

U.S. PATENT DOCUMENTS 6,349,543 B1 * 2/2002 Lisniansky ................... 60/414
6,666,022 B1 * 12/2003 Yoshimatsu et al. ........... 60/413
6,708,787 B2 * 3/2004 Naruse et al. ............... 180/53.8
6,725,581 B2 * 4/2004 Naruse et al. ................. 60/414

FOREIGN PATENT DOCUMENTS

JP          2002-275945 A       9/2002

* cited by examiner

Primary Examiner—Thomas E. Lazo
(74) Attorney, Agent, or Firm—Frishauf, Holtz, Goodman & Chick, P.C.

(57) ABSTRACT

A device arrangement structure for hybrid construction equipment capable of reducing devices of a charging system in size is provided. For this purpose, in the device arrangement structure: a hydraulic pump (47) is connected to an engine (41) via a first power take-off (46); and a regenerative motor (59), which is regenerated by return oil from hydraulic actuators (10a, 10b), and a generator motor (55), which assists an engine as an electric motor to drive hydraulic pump and generates power with surplus torque of the regenerative motor, are provided in parallel with the hydraulic pump via the first power take-off.

4 Claims, 3 Drawing Sheets

F I G. 3
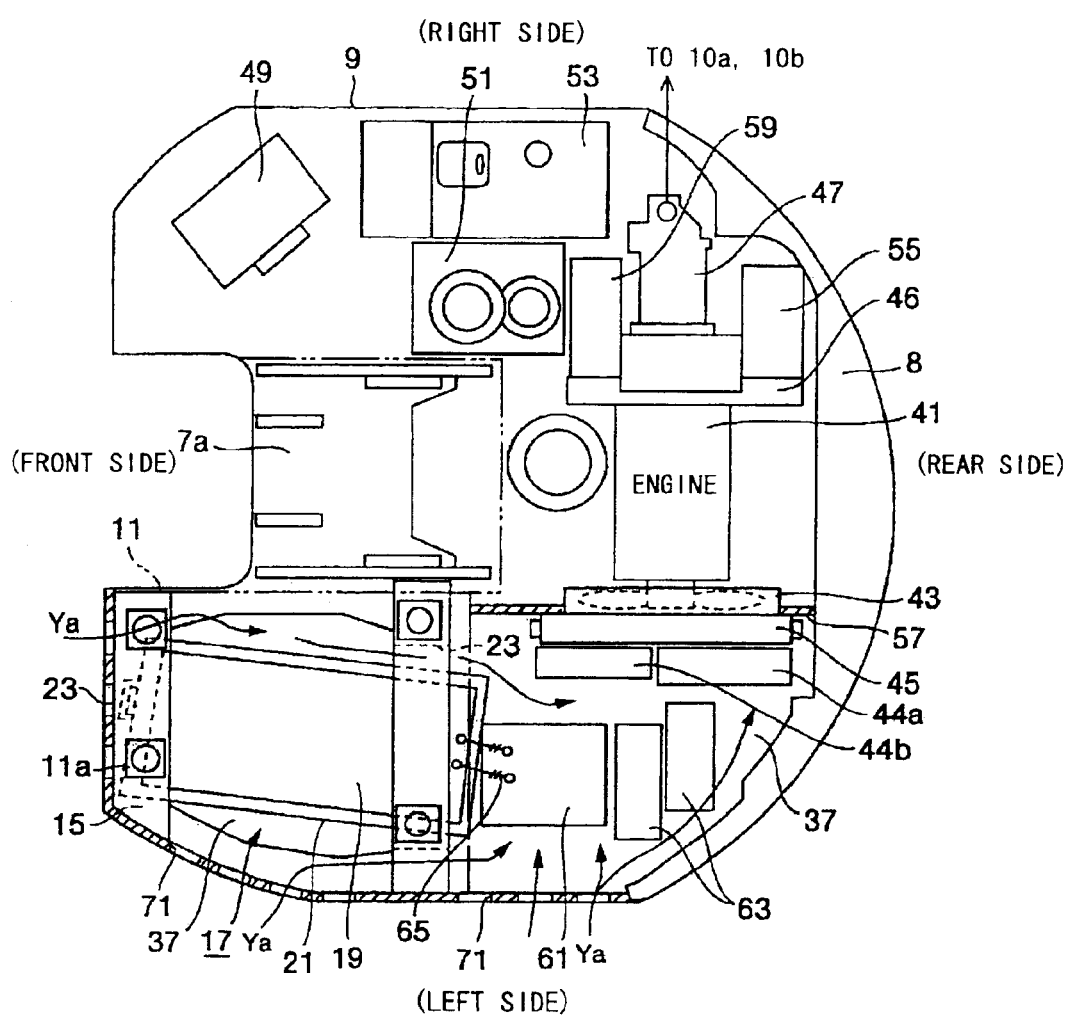

DEVICE ARRANGEMENT STRUCTURE FOR HYBRID CONSTRUCTION EQUIPMENT

TECHNICAL FIELD

The present invention relates to a device arrangement structure for hybrid construction equipment, and it particularly relates to a device arrangement structure for hybrid construction equipment in which a hydraulic pump and a generator motor are connected to an engine.

BACKGROUND ART

As for construction equipment such as a conventional hydraulic shovel, a hydraulically driven type, which controls an inflow of pressure oil discharged from a hydraulic pump with an engine as a power source into each hydraulic actuator so as to carry out drive of each kind of working machine, traveling of vehicle, and the like, is generally used. However, operations of a hydraulic shovel include not only the operations which always require 100% capacity of the capacity of the engine (maximum output horse power), but also a number of operations which can be performed with a smaller capacity (of 80%, for example) than them. Consequently, some hydraulic shovels perform a so-called equal horse power control in which the output of the engine is set in accordance with the level of the engine capacity required for the operation, namely, the magnitude of the working load, and the discharge amount of the hydraulic pump is controlled in accordance with a PQ curve (equal horse power curve). According to this control, the output power of the engine can be utilized effectively, and fuel consumption can be reduced.

The hydraulic shovel for performing the above-described equal horse power control has to be loaded with an engine having an output power corresponding to the maximum required horse power needed to perform the operation with the maximum load required of the hydraulic shovel. However, the load of the hydraulic shovel is not usually constant, and a load variation is very large due to repetition of the operations of excavation, rotation, traveling, earthmoving and the like. As a result, the average load rate with respect to the maximum horse power of the engine in one cycle of an operation is less than 100% (for example, about 80%) depending on the content of the operation, and accordingly, surplus occurs in the engine horse power. This results in the fact that the maximum capacity of the engine, namely, the power which the engine can output is not effectively used in the hydraulic shovel loaded with the engine having the output power equivalent to the maximum required horse power.

In order to solve the above problem, when the output torque of the engine is larger than the driving torque of the hydraulic pump, an inflow of pressure oil, which is discharged from the hydraulic pump, into a hydraulic actuator is controlled, while a first electric motor is driven as a generator with surplus torque of the engine and the generated electric power is charged into a battery. With this, an upper revolving superstructure is rotationally driven by a second electric motor receiving electric power from the battery. When the driving torque of the hydraulic pump becomes larger than the output torque of the engine, the first electric motor is rotationally driven as a motor by the electric power charged in the battery to assist the engine in driving the hydraulic pump. At the time of braking and stopping the upper revolving superstructure, the second electric motor is driven as a generator with the inertia energy thereof, and the generated electric power is charged into the battery. A hybrid construction equipment, in which at the time of lowering a boom, a hydraulic motor provided at a boom cylinder by bypassing is rotationally driven with return oil from the boom cylinder, so that the electric power generated by driving the generator with this rotation is charged into the battery, is proposed (for example, refer to Japanese Patent Laid-open No. 2002-275945).

According to the hybrid construction equipment as described above, when the working load is small, and the driving torque of the hydraulic pump is smaller than predetermined output torque of the engine, the first electric motor is driven as a generator with a surplus of the engine output power and the generated electric power is charged into the battery. On the other hand, when the working load is large, and the driving torque of the hydraulic pump becomes larger than the predetermined output torque of the engine, the first electric motor is rotationally driven as a motor by the electric power charged in the battery to assist the engine in driving the hydraulic pump. As a result, the load rate of the engine is made substantially constant whether the working load is light or heavy, and its average load rate is made large, thus making it possible to use engine output power effectively. The electric power generated by driving the second electric motor as a generator with the inertia energy of the upper revolving superstructure at the time of braking the rotation, and the electric power generated by the generator with potential energy by high-pressure return oil from the boom cylinder at the time of boom lowering are charged into the battery. As a result, the energy can be recovered and reused, and the substantial maximum required horse power of the engine can be made smaller than the prior art.

Incidentally, in the above-described hybrid construction equipment, all of the inertia energy at the time of braking the rotation of the upper revolving superstructure, which is recovered via the second electric motor, and the potential energy at the time of lowering the boom, which is recovered via the generator, as well as the surplus energy of the engine, which is recovered via the first generator, is converted into electric energy and charged into the battery. However, if all the energies are to be recovered reliably and charged into the battery, each of the electric motors, and the generator have to be increased in size, and there arises the problem of requiring a charging device such as a battery of large capacity, which is an increase in size of the devices of the charging system.

SUMMARY OF THE INVENTION

The present invention is made to solve the above-described conventional problems, and has its object to provide a device arrangement structure for hybrid construction equipment capable of reliably recovering energy, and reducing the size of devices of a charging system such as a capacitor device, a generator, and electric motors.

In order to attain the above-described object, a first constitution of a device arrangement structure for hybrid construction equipment according to the present invention is: in hybrid construction equipment in which a hydraulic pump is driven with use of an engine and a generator motor in combination, and an inflow of discharge oil of said hydraulic pump to hydraulic actuators is controlled to drive at least one working machine; such that the hydraulic pump is connected to the engine via a first power take-off (hereinafter, called a first PTO); and i) a regenerative motor which is driven by return oil from the hydraulic actuators and regenerates inertia energy or potential energy of the working machine to drive the hydraulic pump, ii) the generator motor, which is driven as a generator with surplus torque when regeneration torque of the regenerative motor is larger than driving torque of the hydraulic pump, and is driven as an electric motor to assist with drive of the hydraulic pump, are provided in parallel with the hydraulic pump via the first PTO.

According to the above first constitution, the regenerator motor is driven by the return oil from the hydraulic actuator to convert the energy of the working machine into regeneration torque, and the hydraulic pump is driven with this regeneration torque via the first PTO, that is, the regeneration torque is immediately used as the driving torque for the hydraulic pump. In this situation, when the regeneration torque is larger than the driving torque of the hydraulic pump, the hydraulic pump is driven by only the regeneration torque instead of the engine. On the other hand, when, for example, the regeneration torque is smaller than the driving torque of the hydraulic pump, only an amount of deficiency of torque which is the result of subtracting the regeneration torque amount from the hydraulic pump driving torque is outputted by the engine, or the generator motor is driven as the electric motor to assist with drive of the hydraulic pump. As a result, the average required horse power of the engine becomes low, and thus the engine can be reduced in size.

Since the generator motor is driven with the surplus torque which is not used as the driving torque of the hydraulic pump, among the regeneration torque and the generated electric power is charged into the capacitor device, only the regeneration energy of the surplus torque flows into the devices of the charging system such as the capacitor device, the generator motor, and the inverter. As a result, the capacitor device, the generator motor and the inverter can be made compact, and energy can be surely recovered. Further, since the hydraulic pump, the regenerative motor and the generator motor are placed at the engine in parallel with each other via the first PTO, the length in the direction of the engine output shaft, of the installation space for these devices connected to the engine can be made smaller than the total lengths of them.

A second constitution of the device arrangement structure for the hybrid construction equipment according to the present invention is: in a device arrangement structure for hybrid construction equipment in which a hydraulic pump is driven with use of an engine and a generator motor in combination, and an inflow of discharge oil of the hydraulic pump to hydraulic actuators is controlled to drive at least one working machine; includes devices of a high pressure hydraulic system including i) the hydraulic pump connected to the engine via a first power take-off, ii) a hydraulic valve for controlling an inflow of discharge oil to the hydraulic actuators, iii) a regenerative motor which is connected to the hydraulic pump via the first power take-off, driven by return oil from the hydraulic actuators, and regenerates inertial energy or potential energy of the working machine to drive the hydraulic pump, and iv) a working fluid tank for draining the return oil from the hydraulic actuators via the regenerative motor; and devices of a charging system including a) the generator motor which is driven as a generator with surplus torque when regeneration torque of the regenerative motor is larger than driving torque of the hydraulic pump, and is driven as an electric motor to assist with drive of the hydraulic pump, b) a capacitor device which is charged with generation electric power of the generator motor as the generator, and supplies driving electric power as the electric motor, and c) an inverter which controls charge of the generator motor to the capacitor device, and drive of the generator motor as the electric motor, are placed separately from the devices of the high pressure hydraulic system.

According to the above second constitution, the same operational effects as in the above-described first constitution are obtained. Further, the devices of the charging system are placed separately from the devices of the high pressure hydraulic system, the devices of the charging system are hardly given the influence of the heat from the devices of the high pressure hydraulic system, and the rise in temperature thereof is suppressed, thus making it possible to improve reliability of the devices of the charging system.

In the device arrangement structure: the inverter may be placed at an upstream side of a fan driven by the engine; and the generator motor may be connected to the engine, at a side near to the inverter. According to this constitution, the generator motor is connected to the end portion of the engine, which is at a side near to the inverter, and therefore the wiring length of the generator motor and the inverter is shortened.

Consequently, the electrical power loss between them can be made small, and therefore the driving efficiency of the generator motor and the regeneration effect can be improved. The electric noises occurring from the wiring between them are reduced, and therefore reliability can be improved. Further, since the inverter is placed at the upstream side of the fan, the rise in the temperature of the inverter can be suppressed by cooling with the outside air, and reliability of the operation can be improved.

In the device arrangement structure: the inverter may be placed at an upstream side of a suction type fan driven by the engine; and the generator motor may be connected to the engine via a second power take-off provided at the engine, at a side near to the fan. According to this constitution, the generator motor is connected via the second power take-off provided at the end portion of the engine, which is at the side near to the suction type fan, namely, the side near to the inverter, and therefore the wiring length of the generator motor and the inverter becomes short. Further, the inverter is placed at the upstream side of the fan. As a result of these, the same operational effects as the above-described constitution can be obtained.

BRIEF DESCRIPTION OF THE DRAWINGS

FIG. 3 is an arrangement plan of each device expressed in a plan view of an upper revolving superstructure, according to a second embodiment of the present invention.

BEST MODE FOR CARRYING OUT THE INVENTION

Preferred embodiments of the present invention will be explained in detail below with reference to the drawings. In the following embodiments, the explanation will be made with a hydraulic shovel being cited as an example of the machine to which the present invention is applied.

Figure 1:
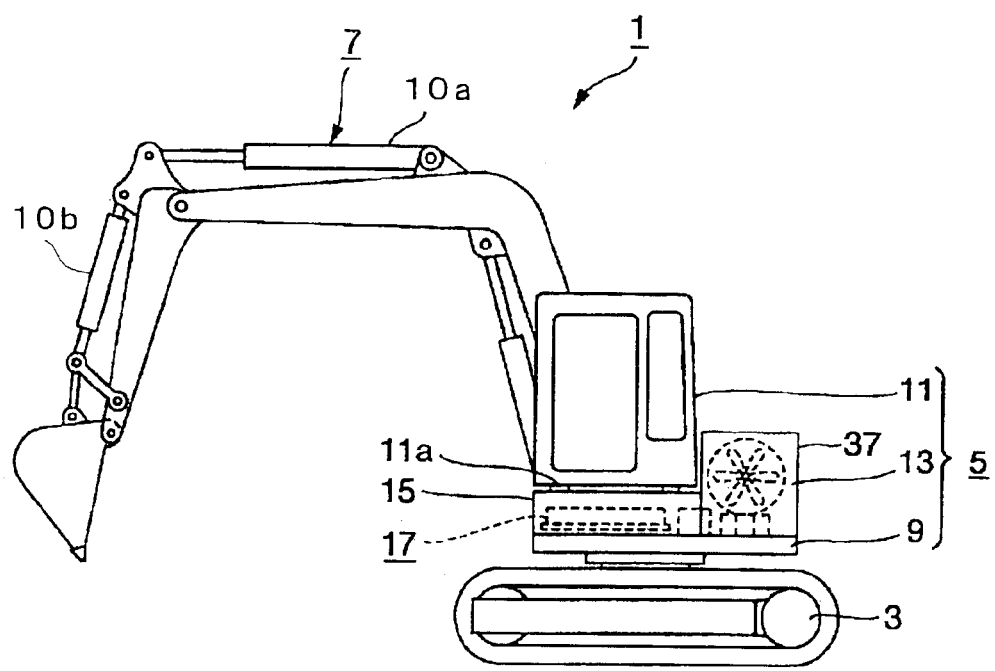
FIG. 1 is a side view of a hydraulic shovel to which the present invention is applied.
Figure 2:
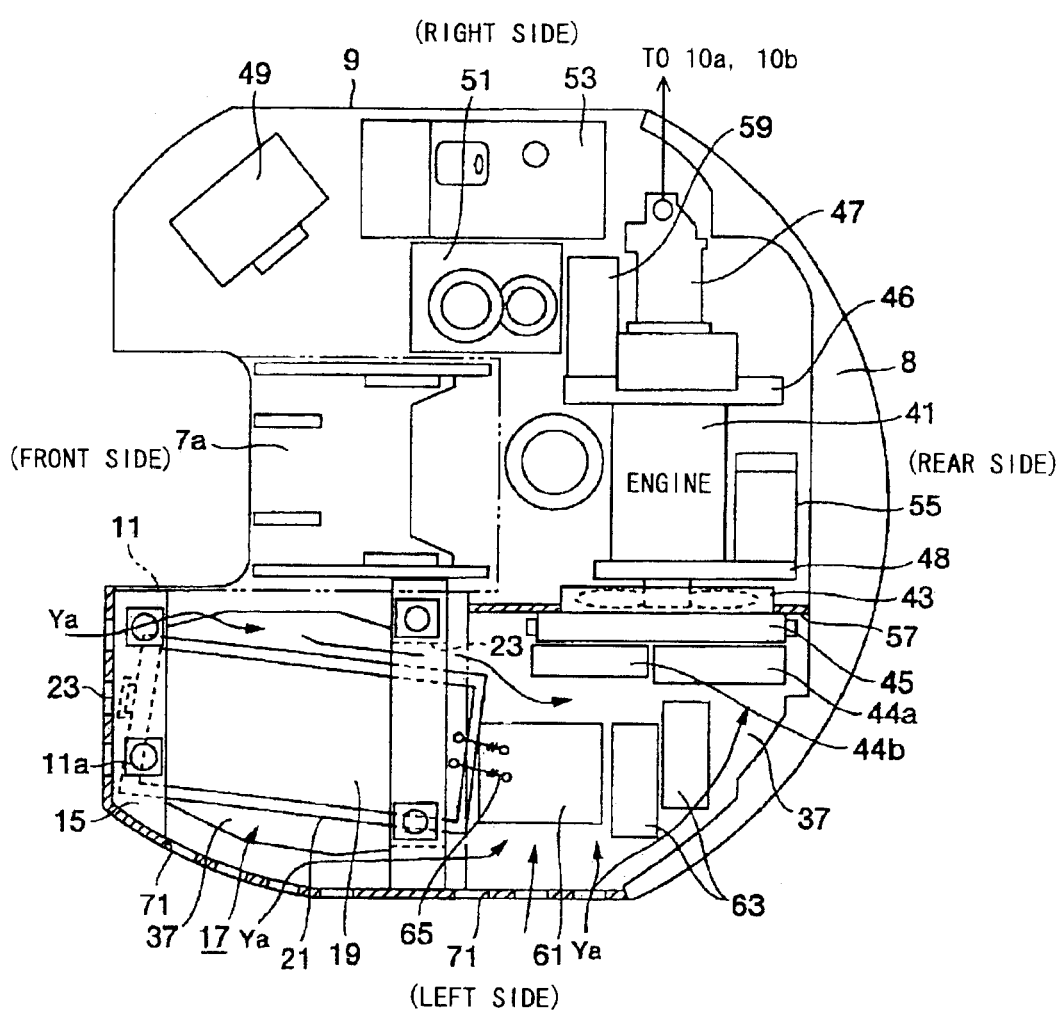
FIG. 2 is an arrangement plan of each device expressed in a plan view of an upper revolving superstructure, according to a first embodiment of the present invention.

In FIG. 1 and FIG. 2, a hydraulic shovel 1 is loaded with an upper revolving superstructure 5 rotatably on a top portion of a lower traveling unit 3, and is provided with a working machine 7 for performing an operation such as excavation, for example, at a substantially central portion in a lateral direction of a front part of the upper revolving superstructure 5 to be able to hoist and lower. FIG. 1 shows the case in that a crawler type traveling unit is used as the lower traveling unit 3, but this is not restrictive, and an ordinary lower traveling unit is applicable. A driver's cab 11 is placed at a left front portion of a top portion of a revolving frame 9, which is a base frame of the upper revolving superstructure 5, via a driver's cab supporting member 15 having a predetermined height, and a counter weight 8 is mounted to a rear end portion. An engine room 13 housing an engine 41, and devices and the like of an engine system is included at a rear portion and a right portion of the revolving frame 9 in front of the counter weight 8. A bracket 7a for supporting the working machine 7 swingably up and down is placed at a substantially central portion of a front side of the revolving frame 9.

The engine room 13 houses the engine 41, a fan 43, a radiator 45, an oil cooler 44a, an aftercooler 44b, a hydraulic pump 47, a hydraulic valve 49, a working fluid tank 51, a fuel tank 53, a generator motor 55, a regenerative motor 59 and the like. The engine 41 is placed horizontally (namely, with a crankshaft facing in a lateral direction of the vehicle) at a substantially central portion at a rear portion on the revolving frame 9, with a front portion in a crankshaft direction facing to the left of the vehicle. The fan 43, the radiator 45, the oil cooler 44a and the aftercooler 44b are placed at a front side in the crankshaft direction of the engine 41.

The hydraulic pump 47 and the regenerative motor 59 are connected to the engine 41 via a first power take-off 46 (hereinafter called a first PTO 46) provided at a rear portion in the crankshaft direction of the engine 41. The generator motor 55 is connected to the engine 41 via a second power take-off 48 (hereinafter called a second PTO 48) provided at a front portion in the crankshaft direction, and is placed at a side of the engine 41. The working fluid tank 51 and the hydraulic valve 49 are placed at a right portion on the revolving frame 9, in the vicinity of the hydraulic pump 47 and the regenerative motor 59, and the fuel tank 53 is placed at a right end portion on the revolving frame 9.

The hydraulic pump 47 sucks up oil of the working fluid tank 51 and pressurizes it, and switches the pressure oil with the hydraulic valve 49 operated by an operation lever provided at the driver's cab 11 to drive each of actuators 10a and 10b of the working machine 7. In the hydraulic valve 49, a plurality of main valves for respectively driving the actuators 10a and 10b of the working machine 7 are integrally mounted in a stacked form. In FIG. 1, the hydraulic cylinders are shown as the actuators 10a and 10b, but as the actuators, various kinds of ordinary hydraulically driven actuators for driving the various working machines such as a hydraulic motor (not shown) are included.

The regenerative motor 59 is connected to one of the main valves in the hydraulic valve 49 via a first pipe line (not shown) and connected to the working fluid tank 51 via a second pipe line (not shown). The regenerative motor 59 is operated by receiving the return pressure of each of the actuators 10a and 10b from the hydraulic valve 49, and assists the engine 41 in driving the hydraulic pump 47 with the regeneration torque via the first PTO 46. The regenerative motor 59 also drives the generator motor 55 as a generator via the second PTO 48 with the surplus torque at this time, and recovers energy.

The generator motor 55 is connected to an inverter 61 by wiring (not shown), and is controlled as an electric motor by the inverter 61. The generator motor 55 sometimes assists the drive of the hydraulic pump 47 with its driving torque via the first PTO 46, and it is sometimes rotationally driven as a generator with the surplus torque of the engine 41 and the regeneration torque of the regenerative motor 59 via the second PTO 48.

Meanwhile, the engine room 13 is partitioned by a masking shield 57 outside the radiator 45, and an intake chamber 37 is formed at an opposite side of the engine 41 with respect to the masking shield 57. The intake chamber 37 is located behind the driver's cab 11, and is formed on the revolving frame 9 adjacently to the driver's cab 11. The intake chamber 37. houses the inverter 61 and a battery 63 therein, and the battery 63 is placed adjacently to the inverter 61. The battery 63 is constituted of two batteries in this embodiment, but the number of the batteries is not limited to this number. The inverter 61 and the generator motor 55 are both placed at a side of the engine 41, where the fan 42 is provided, and the distance between them is short, so that length of wiring for connecting both of them is short.

A capacitor 19 of a capacitor device 17 is placed under the driver's cab 11. Namely, the driver's cab 11 is mounted on a top surface of the driver's cab supporting member 15 via a predetermined number of shock mountings 11a. The driver's cab supporting member 15 is in a gate shape in the front view and has openings 23 and 23 at a front and rear portion, and a central portion of the gate shape is formed at a predetermined distance from the top surface of the revolving frame 9 to house the capacitor device 17 including the capacitor 19 in its inner space.

The inverter 61 is provided adjacently to the capacitor 19, and connected to the capacitor 19 with short wiring 65. Since the inverter 61 and the capacitor 19 are placed adjacently to each other, the wiring 65 connects them with the shortest length. The inverter 61 controls rotation of the generator motor 55 as an electric motor with electric accumulation energy of the capacitor 19, or the energy electrically generated by the generator motor 55 is stored (charged) in the capacitor 19. This can enhance the driving efficiency in the inverter 61 and the regeneration efficiency by the generator motor 55, and reduce an electric noise generated from the wiring 65, thus increasing reliability of the devices.

The battery 63 is used for starting the engine, for control instruments such as a sensor and a controller (not shown), and for electric power supply for lights and the like, and outputs voltage of, for example, DC24V. It may be suitable to connect the battery 63 to the capacitor 19 via a battery charger with wiring (not shown), and convert the voltage (for example, DC350V) of the capacitor 19 into DC24V by this battery charger to charge the battery 63.

The capacitor device 17 includes the capacitor 19 for storing electric power, and a capacitor bracket 21 on which the capacitor 19 is mounted and fixed with a predetermined fixing member (not shown), and which is provided on the revolving frame 9 to be movable in a longitudinal direction of the vehicle. The capacitor 19 is placed such that it can go in and out from the opening 23 at the front side of the driver's cab supporting member 15 in the state in which the capacitor 19 is mounted on the capacitor bracket 21. A capacitor capable of storing electric charge at high voltage with large capacitance is used for the capacitor 19 in this embodiment, and its maximum operating voltage is, for example, DC350V. As the capacitor 19, any capacitor may be used if it is capable of compactly storing the electric charge at high voltage with large capacitance, and, for example, a lithium cell or the like may be used.

The driver's cab supporting member 15 has its front surface covered with an outer lid, and has its side surface covered with an outer cover, and when the capacitor device 17 is pulled out of the opening 23 at the front side, the aforementioned outer lid is opened. Intake ports 71 are formed at the outer cover with which an inner space of the driver's cab supporting member 15 and the intake chamber 37 are covered, and the capacitor 19, the inverter 61 and the battery 63 are cooled by cooling air from the intake ports 71, which is caused by suction of the fan 43 rotated by the drive of the engine 41. This makes it possible to suppress a rise in temperature of the capacitor 19 and the inverter 61, and reliability of the capacitor 19 and the inverter 61 can be increased.

Operations and effects according to the above-described constitution will be explained. The engine 41 is driven to rotate the hydraulic pump 47, which sucks up oil of the working fluid tank 51 and pressurizes it, and each of the actuators 10a and 10b (namely, each of the hydraulic cylinders 10a and 10b) is driven with the pressure oil to operate the working machine 7, whereby the hydraulic shovel 1 performs operations such as excavation and leveling. The regenerative motor 59 is rotated by the return oil from each of the actuators 10a and 10b to regenerate the potential energy and the inertia energy of the working machine 7, and this regeneration torque is immediately used for driving the hydraulic pump 47.

In this situation, when the regeneration torque of the regenerative motor 59 is larger than the driving torque of the hydraulic pump 47, the hydraulic pump 47 is rotationally driven with only the regeneration torque of the regenerative motor 59. On the other hand, when the regeneration torque of the regenerative motor 59 is smaller than the driving torque of the hydraulic pump 47, the engine 41 outputs only a torque deficiency which is the result of subtracting the aforementioned regeneration torque amount from the driving torque of the hydraulic pump 47, and the hydraulic pump 47 is driven with the regeneration torque of the regenerative motor 59 and the output torque of the engine 41. This reduces the average required horse power of the engine 41, and therefore the engine 41 can be made compact. Since the generator motor 55 is driven as the electric motor, and this driving torque can assist in driving the hydraulic pump 47, the average required horse power of the engine 41 can be further reduced, and reduction in size of the engine 41 is further facilitated.

As described above, when the hydraulic pump 47 is rotationally driven with only the regeneration torque, the generator motor 55 is driven as the electric motor with the surplus regeneration torque which is not used for driving the hydraulic pump 47, and only the generated electric power of the surplus torque amount is charged into the capacitor device 17 via the inverter 61. Consequently, only small electric power flows through the capacitor device 17, the generator motor 55, and the inverter 61. As a result, the capacitor device 17, the generator motor 55 and the inverter 61 can be made compact. In addition, the regeneration energy can be reliably recovered.

The compact capacitor with large capacitance, a lithium ion cell, or the like, which enables electrical charge and discharge with large current at high voltage, in a small number at a high speed with a high frequency, is used to constitute the capacitor 19 of the capacitor device 17. The wiring 65 for connecting the capacitor 19 and the inverter 61 provided adjacently to this is short wiring, and connects them in a simple form. Since the generator motor 55 is connected to an end portion of the engine, which is at a side near to the inverter 61 (a mounting side of the fan 43 in this embodiment), via the second PTO 48, the length of wiring between the inverter 61 and the generator motor 55 is shortened. As a result, electric power loss by the wiring can be reduced when the generator motor 55 is driven by the inverter 61 and when the generated electric power of the generator and motor 55 is charged into the capacitor 19. Since generation of the electrical noise from the above-described wiring can be reduced, reliability of the devices can be increased. Further, since the capacitor 19 is placed at the one spot under the driver's cab, an inspection operation and a replacement operation are facilitated.

The hydraulic pump 47 and the regenerative motor 59 are connected to the first PTO 46 provided at a rear portion in the crankshaft direction of the engine 41, and the working fluid tank 51 and the hydraulic valve 49 are placed on the right portion on the revolving frame 9, in the vicinity of the hydraulic pump 47 and the regenerative motor 59. Namely, these devices of the high pressure hydraulic system are placed to concentrate on the right side of the vehicle. On the other hand, the generator motor 55 is connected to the engine 41 via the second PTO 48 provided at the front portion in the crankshaft direction of the engine 41, and the inverter 61 and the capacitor device 17 are also placed at the position of the intake chamber 37 and its vicinity at an upstream side of the fan 43 provided at a front side in the crankshaft direction. Namely, these devices of the charging system are placed at the left side of the vehicle. Since the charging system devices are placed in a position separate from the devices of the high pressure hydraulic system, they are hardly given the effect of heat of the devices of the high pressure hydraulic system, and since the devices of the charging system is located at the upstream side of the fan cooling air from the devices of the high pressure hydraulic system, a rise in temperature is suppressed, and reliability of the operations can be improved.

Further, the engine 41 rotationally drives the fan 43 to suck up (arrow Ya) outside air via the intake ports 71. Since the rise in the temperature of these devices is suppressed by cooling the capacitor 19, the inverter 61 and the battery 63 by this outside air at low temperature, they can be prevented from becoming unstable in their operations because the temperature in use becomes high, and reliability of theses devices, which are vulnerable to heat, can be improved. Since the capacitor 19 is singularly housed in the space under the driver's cab 11, the capacitor 19 can be efficiently cooled in the large space by the outside air. Since the distance between the battery 63 for ordinary electrical components and the capacitor device 17 is short, the electric power loss by the wiring resistance between them can be reduced and the charging efficiency can be enhanced when the battery 63 is charged with the capacitor 19 which is charged by the generator motor 55.

The hydraulic pump 47 and the regenerative motor 59 are provided in parallel with each other via the first PTO 46, and the generator motor 55 is connected to the second PTO 48 to be provided in parallel with the engine 41. As a result, the length of the installation space for them in the engine output shaft direction becomes shorter than the total length of lengths of the hydraulic pump 47, the regenerative motor 59 and the generator motor 55, and therefore the lateral width of the upper revolving superstructure 5 can be made small. Since rotary shafts of them are individually provided by being displaced via the first PTO 46, these devices can be compactly placed in accordance with a vacant space around them.

Next, a second embodiment will be explained based on FIG. 3. The generator motor 55 is provided in parallel with the hydraulic pump 47 and the regenerative motor 59 via the first PTO 46 provided at a rear portion in a crankshaft direction, of the engine 41. The other constitution is the same as the first embodiment. According to the second embodiment, the hydraulic pump 47, the regenerative motor 59 and the generator motor 55 are provided in parallel with each other via the first PTO 46. Consequently, the length in the shaft direction of the installation space for them is shorter than the total of the respective lengths of the hydraulic pump 47, the regenerative motor 59 and the generator motor 55, and therefore the lateral width of the upper revolving superstructure 5 can be made small.

Among the devices of the charging system, the generator motor 55 is placed at the first PTO 46, but it is provided at a position at a distance from the hydraulic pump 47 and the regenerative motor 59. The inverter 61 and the capacitor device 17 are placed at a left side which is the opposite to the right side of the vehicle where the devices of the high pressure hydraulic system such as the hydraulic pump 47, and the regenerative motor 59 are placed. Consequently, the devices of the charging system are placed in the position separated from the devices of the high pressure hydraulic system, and therefore they are not influenced by heat of the devices of the high pressure hydraulic system, and the devices of the charging system are located at the upstream side of fan cooling air from the devices of the high pressure hydraulic system. As a result, the rise in temperature is suppressed and reliability of the operations can be improved. The other effects are the same as those in the first embodiment, and therefore the explanation will be omitted here.

Though the example of the hydraulic shovel is shown in the above-described embodiments, but the present invention can be applied to various kinds of construction equipment such as hydraulic shovels with blades, wheel loaders, and mobile cranes. The fans of suction type and extruding type can be used.

What is claimed is:

1. A hybrid power system for driving a hydraulic pump in construction equipment, in which an inflow of discharge oil from the hydraulic pump to hydraulic actuators is controlled to drive at least one working machine, said power system comprising:

an engine for driving the hydraulic pump, said hydraulic pump being connected to said engine via a first power take-off;

a regenerative motor which is driven by receiving return pressure from said hydraulic actuators, and which regenerates at least one of inertia energy and potential energy of said working machine to drive said hydraulic pump; and a generator motor for driving the hydraulic pump in combination with the engine, said generator motor being driven as a generator by surplus torque when a regeneration torque of said regenerative motor is larger than a driving torque of said hydraulic pump, and said generator motor being drivable as an electric motor to assist with driving of said hydraulic pump;

wherein the regenerative motor and the generator motor provided in parallel with said hydraulic pump via said first power take-off.

2. A hybrid power system for construction equipment in which a hydraulic pump is driven by an engine and a generator motor in combination, and in which an inflow of discharge oil from the hydraulic pump to hydraulic actuators is controlled to drive at least one working machine, said system comprising:

(i) devices of a high pressure hydraulic system including:
said hydraulic pump connected to said engine via a first power take-off,
a hydraulic valve for controlling the inflow of the oil to said hydraulic actuators,
a regenerative motor which is connected to said hydraulic pump via said first power take-off, which is driven by return oil from said hydraulic actuators, and which regenerates at least one of inertia energy and potential energy of said working machine to drive said hydraulic pump, and
a working fluid tank for draining the return oil from said hydraulic actuators via said regenerative motor, and (ii) devices of a charging system including:
said generator motor which is driven as a generator with by surplus torque when a regeneration torque of said regenerative motor is larger than aq driving torque of said hydraulic pump, and which is drivable as an electric to assist with driving of said hydraulic pump,
a capacitor device which is charged by generation electric power produced by said generator motor when the generator motor is driven as a generator, and which supplies driving electric power to the electric motor, and
an inverter which controls charging of said capacitor device by the generator motor, and driving of said generator motor by the capacitor device,
wherein said devices of the charging system are placed separately from said devices of the high pressure hydraulic system.

3. The system according to claim 2, wherein said inverter is placed at an upstream side of a fan driven by said engine; and
wherein said generator motor is connected to said engine at a side of said engine nearer to said inverter.

4. The system according to claim 2, wherein said inverter is placed at an upstream side of a suction fan driven by said engine; and
wherein said generator motor is connected to said engine via a second power take-off at a side of said engine nearer to said fan.

* * * * *